Nov. 18, 1958  W. R. BROWNLEE  2,861,197
MEASURING AND CONTROLLING APPARATUS
Filed Jan. 7, 1957  3 Sheets-Sheet 1

INVENTOR.
WILLIAM R. BROWNLEE
BY Arthur H. Swanson
ATTORNEY.

Nov. 18, 1958 W. R. BROWNLEE 2,861,197
MEASURING AND CONTROLLING APPARATUS
Filed Jan. 7, 1957 3 Sheets-Sheet 2

*INVENTOR.*
WILLIAM R. BROWNLEE
BY
*Arthur H. Swanson*
ATTORNEY.

Nov. 18, 1958 W. R. BROWNLEE 2,861,197
MEASURING AND CONTROLLING APPARATUS
Filed Jan. 7, 1957 3 Sheets-Sheet 3

*INVENTOR.*
WILLIAM R. BROWNLEE
BY
ATTORNEY.

United States Patent Office 2,861,197
Patented Nov. 18, 1958

2,861,197

MEASURING AND CONTROLLING APPARATUS

William R. Brownlee, Birmingham, Ala.

Application January 7, 1957, Serial No. 632,917

19 Claims. (Cl. 307—57)

The present invention relates generally to apparatus for use in assigning the loads to the interconnected generating plants of an electric power generating and distributing system in such a manner as to provide the most economical operation of the system. Specifically, the invention relates to a novel form of apparatus of the foregoing type for assigning the loads to the system plants in accordance with the incremental costs of delivered energy for the plants so as to coordinate the incremental generating costs and incremental transmission losses in the system to the end of securing the most economical combination of plant loadings.

More specifically, the present invention pertains to apparatus of the stated type for detecting deviation from economic balance between the system plants in arriving at a measure of the incremental costs of delivered energy for the plants and an optimum plant loading schedule.

A general object of the present invention is to provide improved apparatus for use in assigning the loads to the interconnected generating plants of an electric power generating and distributing system so as to maintain at a minimum the cost of delivered energy in the system, and hence to provide the most economical operation of the system. A specific object of the invention is to provide novel apparatus of this type for automatically coordinating the incremental generating costs and the incremental transmission losses in the system to the end of securing the most economical loading of the system generating plants.

Another specific object of the invention is to provide novel apparatus of the above type for assigning the loads to the system plants in relation to the existing incremental costs of delivered energy for the plants, and for determining what change, if any, should be made to the load on each plant in order to equalize these incremental costs of delivered energy and hence provide the most economical combination of plant loadings.

A more specific object of the invention is to provide novel apparatus of the foregoing type including novel computing means for providing a measure of the incremental transmission losses between two plants solely in terms of the phase angle between the bus voltages of the two plants and the constant ratio of reactance to resistance of the equivalent path joining the two plants. A still more specific object of the invention is to provide novel apparatus of this type for effecting a comparison, for each of selected pairs of plants, between the incremental generating costs for the plants and the incremental transmission loss between them, computed in the manner just mentioned, so as to determine whether the plants are in economic balance.

An even more specific object of the invention is to provide novel apparatus of the above type for combining the results of the comparisons effected between the incremental generating costs and the incremental transmission losses for each pair of plants to form deviation signals which are functions of the amount, if any, that the generation of each plant should be changed with respect to the generation of a chosen reference plant in order to provide the most economical combination of plant loadings, for the existing system load conditions.

A still more specific object of the invention is to provide apparatus as specified above for controlling the plant outputs automatically in accordance with the aforementioned deviation signals so as to faintain an optimum generating schedule and to cause the plants to be loaded automatically in the manner necessary to provide the most economical operation of the system at substantially all times and for all system load conditions within the operating range.

It has been recognized in the past that the maintenance of an optimum generating or loading schedule in a power system, for maintaining economical system operation and a minimum cost of total delivered energy in the system, requires the continual coordination of the system generating costs and transmission losses. To this end, various methods have been developed in the past for obtaining system transmission loss constants, usually referred to as B-type constants, and arrangements have been described for applying these constants to system load scheduling or dispatching problems. These applications have usually involved the comparison of incremental fuel costs and incremental transmission losses in arriving at the optimum generating schedules to be followed, the incremental transmission losses being calculated on the basis of the previously determined B-type constants mentioned above.

As is well known to those skilled in the art, the foregoing previously known and used methods of calculating and coordinating incremental costs and losses for arriving at optimum generating schedules are subject to numerous significant disadvantages. These disadvantages are due, primarily, to the frequently unsatisfactory nature of the B-type constants, to the practical difficulties encountered in obtaining such constants, and to the complexity of the computations involved in applying the constants to the problem and in solving the resulting simultaneous equations.

I have discovered, however, a novel method for determining incremental transmission losses which is not subject to the above-noted disadvantages associated with the B-type loss constants and their use in obtaining optimum generating schedules. Specifically, I have discovered that a unique relationship exists between the incremental transmission loss between two points and the phase angle between the voltages at these points. More specifically, I have discovered that the incremental transmission loss $$\left(\frac{dL}{dP}\right)$$

between two plants can be expressed as a function of solely the phase angle ($\theta$) between the bus voltages of the two plants and the constant ratio of reactance to resistance (K) of the equivalent path joining the two plants.

This unique relationship has been described, developed, and explained in my paper entitled "Co-ordination of Incremental Fuel Costs and Incremental Transmission Losses by Functions of Voltage Phase Angles," which appeared at pages 529 to 533 of part III–A, "Power Apparatus and Systems," of volume 73 of the AIEE Transactions. In that paper, I have shown that the following incremental transmission loss equation properly defines the incremental transmission loss between two plants in terms of solely the factors noted and defined above:

$$\frac{dL}{dP} = \frac{2 \sin \theta}{K \cos \theta + \sin \theta}$$

I have also shown in the above-mentioned paper that this unique expression for incremental transmission loss can be utilized to advantage in a practical comparison method which I have developed for determining, in an accurate but relatively simple manner, when the plants of a system, and hence the entire system, are in economic balance, and hence when the system is operating at a minimum cost of total delivered energy. Specifically, I have shown in said paper that the Plants 1 and 2 of any given pair of plants of a system will have the same incremental cost of delivered energy at any given point, and hence will be in economic balance, when the following economic balance equation, relating the incremental generating costs and incremental transmission losses for the two plants, is satisfied:

$$\frac{dF_2/dP_2}{dF_1/dP_1} = \frac{K \cos \theta + \sin \theta}{K \cos \theta - \sin \theta}$$

wherein: $dF_1/dP_1$ and $dF_2/dP_2$ are the incremental generating costs for Plants 1 and 2, respectively, and $K$ and $\theta$ are the respective reactance-resistance ratio and bus voltage phase angle for the plants as defined above in connection with the incremental transmission loss equation.

As pointed out in said paper, the foregoing balance equation for a pair of plants compares or coordinates the incremental transmission loss ratio between the plants, as determined by my foregoing incremental transmission loss equation, with the incremental generating cost ratio for the plants. Thus, when this balance equation is satisfied, the corresponding plants operate at the same incremental cost of delivered energy at any given point, and are in economic balance. Further, when all pairs of the system plants are in such economic balance, the entire system is in economic balance. In the above equation, $\theta$ is the angle by which the bus voltage at Plant 1 leads the bus voltage at Plant 2.

The foregoing phase angle loss computing and comparison method for determining when the pairs of plants of a system are in economic balance, and when the entire system is in balance, is, and is described in said paper as being, a method which was developed for use in simplifying the adequate planning of power system expansion. I have discovered, however, that this method also constitutes a highly effective, advantageous, and practical tool of relative simplicity for use in assigning the loads to the plants of an actual, operating system so as to provide optimum generating or loading schedules and economical system operation under the actual system loading and operating conditions, inasmuch as the practice of this method requires a knowledge of only three readily obtainable factors: namely, plant incremental generating costs, constant reactance to resistance ratios, and plant bus voltage phase angles. Moreover, the use of this method in the above manner does not involve the disadvantages encountered with the use of the previously known methods employing the B-type loss constants, since the present method is not subject to the deficiencies inherent in the prior methods. These factors, together with the basic concepts involved in my comparison method, make this method a highly desirable and practical one for use in apparatus for automatically determining when the plants of an operating system are in economic balance, for computing what changes, if any, in the plant loadings are needed to provide the most economical combination of plant loadings, and for automatically controlling the loading of the plants in accordance with the computed optimum loading data.

Accordingly, it is an object of the present invention to provide novel apparatus of the type specified hereinbefore which is operative in accordance with the foregoing balance equation and comparison method to assign the loads to the generating plants of an electric power system, in relation to the incremental costs of delivered energy from the plants, to the end of causing all possible pairs of plants to be in economic balance, and hence causing the entire system to be in economic balance and to operate with a minimum cost of delivered energy, for any given system load and notwithstanding variations in the system load and load pattern and/or variations in plant outputs.

To the end of fulfilling the foregoing and other desirable objects of the present invention, the apparatus according to the invention combines plant bus voltage phase angle data for each of selected pairs of plants, supplied to the apparatus by telemetering from the plants or by a simplified network analyzer, with the constant reactance-resistance ratio for the path between the corresponding plants of the pair in arriving at a determination of the incremental transmission loss ratio for each of the selected pairs of plants. This loss ratio for each of said pairs of plants is then compared to the incremental generating cost ratio for the pair of plants, this cost ratio being determined on the basis of plant loading information supplied to the apparatus together with data as to the fuel and other generating costs at the plants.

The comparison which is effected between the incremental transmission loss and incremental generating cost ratios for each of said selected pairs of plants makes it possible to determine when the incremental transmission loss and generating costs are in balance for that pair of plants, and hence when the plants of the pair are in economic balance. The results of these comparisons are representative of the amounts of unbalance between the plants of each corresponding pair, and are combined in the apparatus to form deviation signals which are representative of any deviations from the most economical loading of the corresponding plants with respect to a chosen one of the plants, selected as a reference plant. Accordingly, each of these deviation signals is a function of the relative incremental delivered energy costs for the corresponding plant and the chosen reference plant, and is a function of the amount, if any, that the generation of the corresponding plant should be raised or lowered with respect to the chosen reference plant in order to provide the most economical combination of plant loadings and the minimum cost of delivered energy in the system.

These deviation signals all approach zero value when economical loading and economical system operation are achieved and the incremental delivered energy costs of the plants approach equality. Accordingly, these signals can be applied to deviation-from-balance indicators, and employed to permit economic loadings to be assigned, established, and maintained through the medium of manual control of the plant outputs.

Further, the aforementioned deviation signals can be applied to an automatic plant load control portion, and thus utilized to assign and control the plant loadings or outputs automatically as necessary to maintain economic balance between the plants, the economical loading thereof, and the most economical operation of the system, under the various system load conditions which present themselves.

A better understanding of the present invention may be had from the following detailed description of apparatus embodying the invention, which description is to be read in connection with the accompanying drawings, wherein.

GENERAL DESCRIPTION OF THE FIG. 1 APPARATUS

Figure 1:
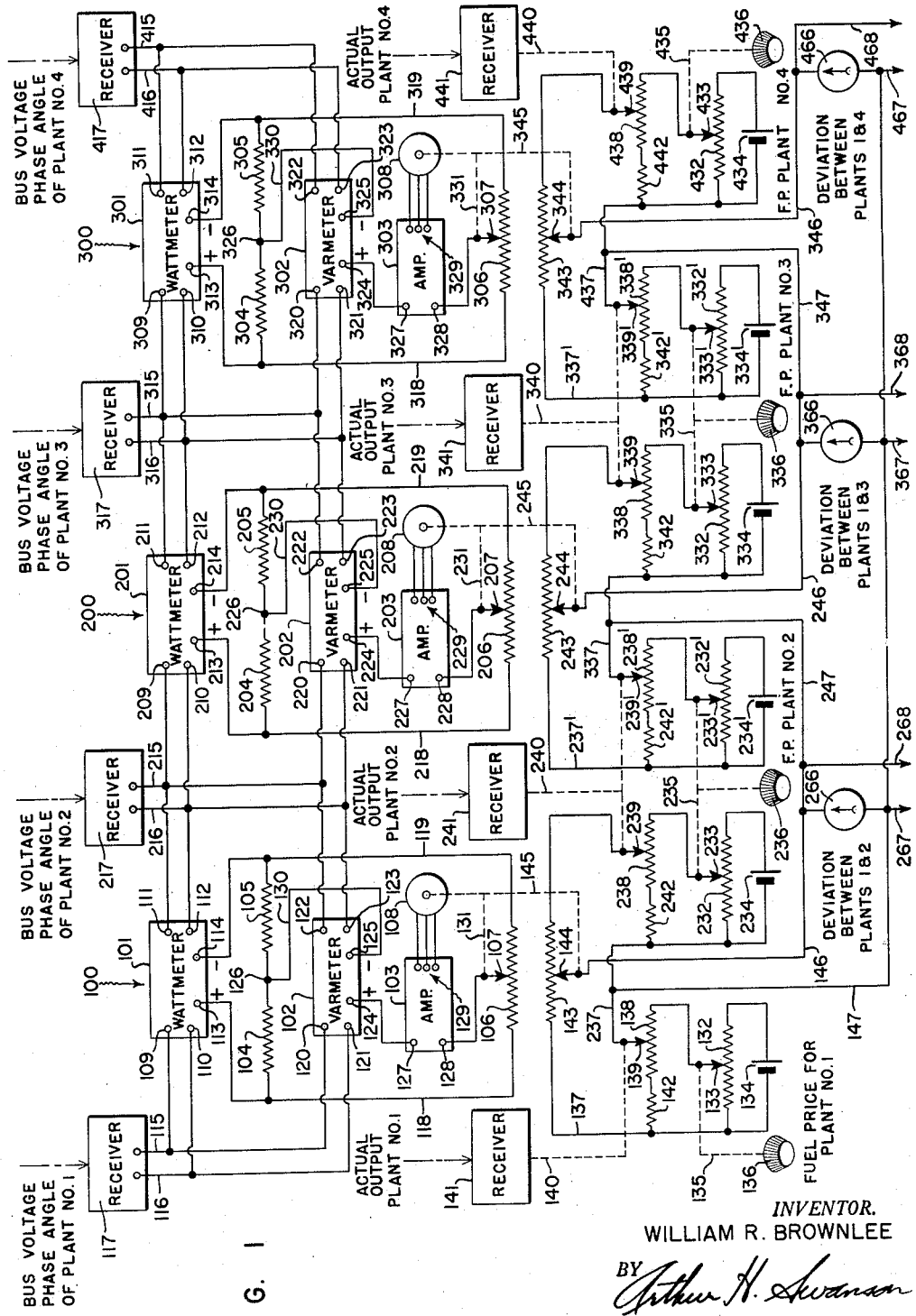
Fig. 1 is a schematic circuit diagram of economic load assigning apparatus embodying the invention.

The economic balance deviation detecting and indicating, or economic load assigning, apparatus embodiment of the invention as illustrated in Fig. 1 has been shown as an arrangement for providing economic balance deviation indications for a typical electric power generating and distributing system, not shown, having four interconnected generating plants. It is to be understood, however, that the power system with which the illustrated apparatus is used could well have more or less than four plants, and/or could well have additional plants which, for one or another reason, are not taken into account by the apparatus, and are not subject to the economic loading data provided thereby. However, for simplicity of description and explanation, it will be assumed herein that the power system whose plant loadings are to be controlled in accordance with the economic balance deviation signals produced by the Fig. 1 apparatus includes only said four plants, and that all of these plants are represented in the apparatus and are to have their generation controlled according to an optimum or economic generating or loading schedule as assigned or dictated by the deviation signals produced by the apparatus.

The apparatus of Fig. 1 includes an economic balance measuring and computing portion, and balance deviation indicating means. The computing portion or computer of the apparatus operates in accordance with the transmission loss and economic balance comparison equations set forth above, and includes three identical sections 100, 200, and 300. Section 100 computes the incremental transmission loss ratio for Plants No. 1 and No. 2, and compares this ratio with the incremental generating cost ratio for these two plants. The results of this comparison appear in the output of computing section 100 as a deviation signal representing any deviation from economic balance between Plants 1 and 2.

Similarly, computing section 200 of the computing portion of the apparatus computes the incremental transmission loss ratio for Plants 2 and 3 of the system, and compares this ratio with the incremental generating cost ratio for Plants 2 and 3. The results of this comparison appear in the output of computing section 200 as a signal representative of any deviation from economic balance between Plants 2 and 3.

In like manner, computing section 300 computes the incremental transmission loss ratio for Plants 3 and 4, and compares this ratio with the incremental generating cost ratio for these plants. The results of this comparison appear in the output of section 300 as a signal repersentative of any deviation from economic balance between Plants 3 and 4.

For the stated purpose of causing the Fig. 1 apparatus to provide indications which reflect any deviation from economic balance between the plants of any of all of the possible pairs of system plants, one of the plants—namely, Plant 1—is chosen as a reference plant, and the above-mentioned three deviation signals for the above-noted three pairs of plants are combined to form final deviation signals which represent any deviation from the most economical loading for Plants 2, 3, and 4 relative to reference Plant 1. By maintaining the plant loadings or outputs at the values necessary to maintain the values of these final deviation signals as close to zero as possible, all possible pairs of plants, and hence the entire system, are maintained susbtantially in economic balance, as will be discussed in more detail hereinafter.

For the purpose of facilitating the following detailed description of the apparatus, the reference characters employed to denote the components associated with Plant 1 are in the 100 series, the reference characters for the components associated with Plant 2 are in the 200 series, and so on. Similarly, the components included in computting section 100 but not individual to any one plant are represented by reference characters in the 100 series, the equivalent components of computing section 200 are represented by reference characters in the 200 series, and so on. In each case, the same component appearing in each section has been designated by the same basic reference number but in the appropriate hundreds series.

Since the computing sections 100, 200, and 300 are identical to each other in structure, and perform identical loss computing and balance determining functions for their respective pairs of plants, the construction and operation of only the section 100 will be described in detail herein, it being understood that this description applies as well to the sections 200 and 300.

DESCRIPTION OF SECTION 100

The computing section 100 computes and compares the incremental transmission loss and incremental generating cost ratios for Plants 1 and 2 in accordance with the economic balance comparison equation as set forth hereinbefore. This means that the components of the section 100 operate in accordance with the foregoing phase angle method of incremental transmission loss computation, and hence the foregoing incremental transmission loss equation, to compute or provides a measure of the incremental transmission loss ratio for Plants 1 and 2, inasmuch as the incremental transmission loss ratio term of said economic balance equation is based on said incremental transmission loss equation, as previously noted. Accordingly, computing section 100 is operative to relate the phase angle $\theta_{1-2}$ between the bus voltages of Plants 1 and 2 with the constant reactance to resistance ratio $K_{1-2}$ of the equivalent path joining Plants 1 and 2 in providing a measure of the incremental transmission loss ratio portion or right-hand term of the economic balance comparison equation set forth above, which ratio, with respect to Plants 1 and 2, is:

$$\frac{K_{1-2} \cos \theta_{1-2} + \sin \theta_{1-2}}{K_{1-2} \cos \theta_{1-2} - \sin \theta_{1-2}}$$

Computation of loss ratio

To the end of providing a measure of the above loss ratio for Plants 1 and 2, section 100 includes a wattmeter device 101 and a varmeter device 102 to which are applied A. C. signals having the actual phase angles of the bus voltages at Plants 1 and 2. The outputs of the devices 101 and 102 are predetermined functions of the phase angle $\theta_{1-2}$ between the bus voltages of Plants 1 and 2, and are combined with the constant reactance-resistance ratio factor $K_{1-2}$ for Plants 1 and 2 in a bridge-type circuit having an amplifier and motor drive device 103 as a bridge output null detector. The bridge circuit also includes equal fixed resistors 104 and 105 and an adjustable slidewire resistor 106 having an adjustable contact 107 which is positioned along the resistor 106 by a balancing motor 108 which in turn is responsive to the output of the null detecting amplifier 103. The amplifier 103 and the motor 108 cooperate continuously to maintain the contact 107 in the position along the resistor 106 necessary to maintain the bridge circuit in balance, under which condition the contact 107 divides the resistor 106 so that the ratio of the voltages and resistances on either side of the contact 107 is maintained equal to the existing numerical value of the incremental transmission loss ratio for Plants 1 and 2 as set forth above.

The manner in which the components of computer section 100 cause the slidewire contact 107 to be positioned in accordance with the value of the above incremental transmission loss ratio for Plants 1 and 2 as just mentioned will now be explained in detail. To this end, it is noted that the wattmeter 101 has a first pair of input terminals 109 and 110, a second pair of input terminals 111 and 112, and a pair of output terminals 113 and 114. Input terminals 109 and 110 are connected by respective conductors 115 and 116 to the output terminals of a telemetering receiver 117 which receives from Plant 1 a signal representative of the phase angle of the bus voltage at Plant 1. Receiver 117 is arranged to apply to the input terminals 109 and 110 of the wattmeter 101 an A. C. signal having a predetermined constant magnitude or value and having a phase, with respect to some reference phase, which represents the phase of the Plant 1 bus voltage with respect to said reference phase. In other words, the phase angle between the signal applied to the wattmeter input terminals 109 and 110 and an arbitrary reference signal represents the actual phase angle existing between the bus voltage of Plant 1 and said arbitrary reference signal. Accordingly, it may be said for convenience that the signal applied to the wattmeter input terminals 109 and 110 has the same actual phase angle as the bus voltage of Plant 1.

In a similar manner, an A. C. signal of said predetermined constant value and at a phase angle representative of the actual phase angle of the bus voltage of Plant 2 is applied to the input terminals 111 and 112 of the wattmeter 101. Specifically, the last mentioned input terminals are respectively connected by conductors 215 and 216 to the output terminals of a telemetering receiver 217 which receives a signal from Plant 2 which is representative of the bus voltage phase angle of Plant 2. Accordingly, the wattmeter 101 is supplied with a first input signal at the actual phase angle of the bus voltage of Plant 1, and a second input signal at the actual phase angle of the bus voltage of Plant 2. Thus, the phase angle between these two wattmeter input signals is equal to the phase angle $\theta_{1-2}$ actually existing between the bus voltages of Plants 1 and 2.

As noted above, the values of the two wattmeter input signals should be maintained equal to each other, or made effectively equal by suitable calibration of the apparatus. As will be explained hereinafter, this common value for the two input signals may be any arbitrarily or conveniently selected one, although it is convenient for purposes of explanation to assume that this value is unity.

The wattmeter 101 is arranged, in a manner to be described hereinafter, to be operative in the presence of the above-described two input signals to produce between its output terminals 113 and 114 a D. C. output signal of a magnitude proportional to the value of $2K_{1-2} \cos \theta_{1-2}$ the actual numerical value of the constant $K_{1-2}$ being introduced into the wattmeter output when calibrating the latter. It will be remembered that $\theta_{1-2}$ is the phase angle by which the bus voltage of Plant 1 leads the bus voltage of Plant 2.

This output signal from the wattmeter output terminals 113 and 114 is applied across the slidewire resistor 106 by means of conductors 118 and 119. The aforementioned resistors 104 and 105 are connected in series between the conductors 118 and 119, and hence are effectively connected in series across the resistor 106. Accordingly, a D. C. signal having a value proportional to the existing value of $2K_{1-2} \cos \theta_{1-2}$ is applied across the slidewire resistor 106 and the series-connected resistors 104 and 105.

The varmeter 102 has a first pair of input terminals 120 and 121, a second pair of input terminals 122 and 123, and a pair of output terminals 124 and 125. The input terminals 120 and 121 are respectively connected by the conductors 115 and 116 to the output terminals of the receiver 117, whereby the aforementioned A. C. signal at the actual phase angle of the Plant 1 bus voltage is applied to the varmeter input terminals 120 and 121.

The varmeter input terminals 122 and 123 are respectively connected by the conductors 215 and 216 to the output terminals of the receiver 217, whereby the aforementioned A. C. signal at the actual phase angle of the Plant 2 bus voltage is applied between the last mentioned input terminals. Accordingly, the varmeter 102 is supplied with the two A. C. input signals supplied to the wattmeter 101 and having the angle $\theta_{1-2}$ as the phase angle between them.

The varmeter 102 is arranged, in a manner to be described hereinafter, to be operative in the presence of the above-described two input signals to produce between its output terminals 124 and 125 a D. C. output signal of a magnitude proportional to $\sin \theta_{1-2}$. In a manner now to be described in detail, this varmeter output signal is applied to the input of the amplifier 103 in series with a signal which is developed, from the wattmeter output signal, between the slidewire contact 107 and a junction point 126 between the resistors 104 and 105.

The amplifier 103 has input terminals 127 and 128, and also has output terminals 129 which are connected to the input of the balancing motor 108. To the end of connecting the varmeter output in series with the input of the amplifier 103 between the slidewire contact 107 and the point 126, the varmeter output terminal 125 is connected by a conductor 130 to the point 126, while the remaining varmeter output terminal 124 is connected to the amplifier input terminal 127. The remaining amplifier input terminal 128 is connected to the contact 107. Accordingly, the amplifier input has applied thereto in series the varmeter output signal and the signal between the contact 107 and the point 126.

The amplifier and motor drive device 103 and the balancing motor 108 are assumed herein to be of conventional form, and may, for example, take the form of the motor drive amplifier and balancing motor disclosed in the Wills Patent No. 2,423,540. In the manner described in detail in said Wills patent, the amplifier 103 is operative to cause rotation of the motor 108 in a direction dependent upon the polarity of the input signal applied between the input terminals 127 and 128, and is operative to prevent rotation of the motor 108 when the value of the amplifier input signal becomes substantially zero.

Since the slidewire contact 107 is mechanically positioned along the resistor 106 by the motor 108, as by a mechanical linkage 131, the amplifier 103 is operative to control the rotation of the motor 108 to position the contact 107 along the resistor 106 in accordance with the magnitude and polarity of the amplifier input signal. Therefore, upon the appearance of an amplifier input signal between the input terminals 127 and 128, the amplifier 103 is operative to actuate the motor 108 to cause the latter to position the contact 107 along the resistor 106 in the direction and to the extent necessary to reduce the amplifier input signal substantially to zero, and hence to rebalance the circuit.

Accordingly, it is seen that the amplifier 103 and the motor 108 cooperate continually to maintain the contact 107 in a position of circuit balance along the resistor 106.

When the apparatus is in the condition of circuit balance as just described and there is thus no signal applied to the input of the amplifier 103, and the wattmeter and varmeter output signals have the polarities indicated in Fig. 1, there is produced across the left-hand portion of the resistor 106, between the left-hand end thereof and the contact 107, a voltage drop proportional to the existing value of $K_{1-2} \cos \theta_{1-2} - \sin \theta_{1-2}$. Simultaneously, there is produced across the right-hand portion of the resistor 106, between the contact 107 and the right-hand end of resistor 106, a voltage drop proportional to the existing value of $$K_{1-2} \cos \theta_{1-2} + \sin \theta_{1-2}$$

The manner in which the circuit balance position of the contact 107 results in the production of these two voltage drops or signals across the left-hand and right-hand portions, respectively, of the slidewire resistor 106 is readily apparent in the light of the foregoing description.

It will be noted that the ratio of the right-hand one of the above voltage drops to the left-hand one of these voltage drops is the incremental transmission loss ratio for Plants 1 and 2 as set forth above. Therefore, it is apparent that the apparatus under the condition of circuit balance causes the slidewire contact 107 to be positioned in accordance with the existing value of the incremental transmission loss ratio for Plants 1 and 2.

Summarizing the foregoing description of the operation of the incremental transmission loss ratio computing circuit of the section 100, it is noted that the wattmeter 101 applies in this circuit an output signal which is proportional to $2K_{1-2} \cos \theta_{1-2}$, while the varmeter 102 applies in the circuit an output signal proportional to $\sin \theta_{1-2}$. The amplifier 103 and balancing motor 108 operate in response to these signals to position the contact 107 along the resistor 106 as necessary to maintain the circuit in balance, under which condition the contact 107 divides the resistor 106 so that the ratio of the voltages and resistances on either side of the contact 107 is equal to the existing numerical value of the incremental transmission loss ratio for Plants 1 and 2. Therefore, the contact 107 is continuously positioned along the resistor 106 in accordance with the value of this ratio.

Computation of cost ratio

It will be remembered that the function of the computing section 100 is to compute the incremental transmission loss and incremental generating cost ratios for Plants 1 and 2, and to compare these ratios in accordance with the foregoing economic balance comparison equation so as to produce a deviation signal representative of any deviation from economic balance between Plants 1 and 2. Since there has been described above the apparatus for computing the incremental transmission loss ratio by the phase angle method, and for causing the contact 107 to be positioned in accordance with this ratio, the next apparatus portion to be described is that which computes the incremental generating cost ratio for Plants 1 and 2 and which compares this ratio with the above incremental transmission loss ratio so as to produce the aforementioned economic balance deviation signal for Plants 1 and 2. This ratio, which is the left-hand term of the foregoing economic balance comparison equation, is as follows for Plants 1 and 2:

$$\frac{dF_2/dP_2}{dF_1/dP_1}$$

wherein $dF_1/dP_1$ and $dF_2/dP_2$ are the incremental generating costs for Plants 1 and 2, respectively.

The circuit portion of the section 100 which computes the above incremental generating cost ratio for Plants 1 and 2, and compares this ratio to the computed incremental transmission loss ratio, includes an adjustable fuel price or cost slidewire resistor 132 for Plant 1 having an adjustable contact 133, and also includes an adjustable fuel price slidewire resistor 232 for Plant 2 having an adjustable contact 233. A suitable direct current source, shown for convenience as a battery 134, is connected across the resistor 132, while a similar battery 234 is shown connected across the resistor 232. It is noted that these batteries, as well as the corresponding ones of the other computing sections, can be replaced by suitable direct current sources of other forms, if desired.

The purpose of the Plant 1 fuel price resistor 132 is to provide a voltage which is adjustable so as to be proportional to the existing price of fuel at Plant 1. To this end, the contact 133 of the resistor 132 is connected by a suitable mechanical linkage 135 to a manually adjustable knob 136. By the proper adjustment of the knob 136 there is produced between the contact 133 and a conductor 137, connected to the left-hand end of the resistor 132, a voltage which is maintained proportional to the price of fuel at Plant 1.

Similarly, the contact 233 of the Plant 2 fuel price resistor 232 is connected by a suitable mechanical linkage 235 to a manually adjustable knob 236. The proper adjustment of this knob causes a voltage to be produced between the contact 233 and a conductor 237, connected to the left-hand end of the resistor 232, which is proportional to the price of fuel at Plant 2.

If desirable, the contact 133 of the fuel price resistor 132, as well as one or more of the contacts of the other fuel price resistors in the apparatus, can be arranged to be adjusted automatically and/or from a remote location instead of manually as shown. For example, it may be desirable in some instances to have the fuel price resistor contacts adjusted directly by and from the corresponding stations, as by telemetering.

For the purpose of providing a measure of the existing incremental generating cost for Plant 1, $dF_1/dP_1$, in terms of the Plant 1 fuel price as set into the circuit by the means described above, the circuit includes a Plant 1 output or load slidewire resistor 138 having an adjustable contact 139 which is arranged to be adjusted in accordance with the actual output of Plant 1. To this end, the contact 139 is shown in Fig. 1 as being arranged to be adjusted through a suitable mechanical linkage 140 by the output of a telemetering receiver 141 which receives an input representative of the actual output of Plant 1. It is noted that other ways of adjusting the contact 139 along the resistor 138 in accordance with the actual output of Plant 1 can be used if desired.

The resistor 138 is connected in series with a resistor 142, representing the fixed component of incremental generating costs at Plant 1, between the fuel price resistor contact 133 and the conductor 137. Accordingly, the Plant 1 fuel price voltage or signal is applied across the resistors 138 and 142 in series, whereby there is produced between the contact 139 and the conductor 137 a voltage which is maintained proportional to the existing incremental generating cost for Plant 1. The fixed and variable portions of this cost voltage are supplied, respectively, by the fixed cost resistor 142 and the adjusted plant output resistor 138, in cooperation with the adjusted fuel price resistor 132.

Similarly, the incremental generating cost ratio circuit includes means for producing a voltage or signal proportional to the existing incremental generating cost for Plant 2. This means includes a slidewire resistor 238 having an adjustable contact 239 which is arranged to be adjusted in accordance with the actual output of Plant 2 by a telemetering receiver 241 through a suitable mechanical linkage 240. The Plant 2 load resistor 238 is connected in series with a fixed cost resistor 242 between the conductor 237 and the contact 233 of the Plant 2 fuel price resistor 232, whereby there is maintained between the conductor 237 and the load resistor contact 239 a voltage proportional to the existing incremental generating cost of Plant 2, $dF_2/dP_2$.

Comparison between loss and cost ratios

To this end of effecting the comparison between the incremental transmission loss ratio for Plants 1 and 2, established by the position of the contact 107 along the resistor 106, and the ratio of the incremental generating costs for Plants 1 and 2, represented by the two incremental generating cost voltages produced in the manner just described, the apparatus includes a cost ratio slidewire resistor 143 having an adjustable contact 144 which is arranged to be adjusted by the balancing motor 108, along with the contact 107, through a suitable mechanical linkage 145. By virtue of this arrangement, the position of the contact 144 along the cost ratio resistor 143 corresponds to the position of the contact 107 along the loss ratio resistor 106.

The two voltages respectively representative of the existing incremental generating costs for Plants 1 and 2 are applied in series across the resistor 143. To this end, the conductor 137 is connected to the left-hand end of the resistor 143, while the right-hand end thereof is connected to the contact 239. Also, the contact 139 is connected directly to the conductor 237. The circuit supplying the aforementioned two cost voltages to the resistor 143 can thus be traced from the left-hand end thereof through the conductor 137, the resistor 142, and the left-hand portion of the resistor 138 to the contact 139, from the contact 139 through the conductor 237, the resistor 242, and the left-hand portion of the resistor 238 to the contact 239, and from the contact 239 to the right-hand end of the resistor 143.

By virtue of the foregoing structure and relationships, the adjusted slidewire resistors 106 and 143 compare the incremental transmission loss and incremental generating cost ratios for Plants 1 and 2 in accordance with the economic balance comparison equation set forth hereinbefore. When Plants 1 and 2 are not in economic balance, and hence do not have equal incremental costs of delivered energy, the balance equation is not satisfied, and the incremental generating cost ratio is not equal to the incremental transmission loss ratio for the plants. Under this condition of a deviation from the balanced condition for Plants 1 and 2, there is produced between the contact 144 and the conductor 237, and hence between output conductors 146 and 147 respectively connected thereto, a deviation-from-balance signal of a magnitude representative of the extent of economic unbalance or deviation from economic balance between Plants 1 and 2, and of a polarity indicative of the direction of the unbalance.

The magnitude of this deviation signal is also a function of the difference between the incremental delivered energy costs for Plants 1 and 2, and the polarity of the signal in this connection is dependent upon whether the incremental delivered energy cost for Plant 2 is greater or less than that for Plant 1. Also, this deviation signal is representative of the extent and direction of departure or deviation from the most economic loading for Plant 2 relative to Plant 1. Consequently, this signal is indicative of the need for a change in the loading or output of Plant 2 relative to Plant 1 in order to obtain economic balance between Plants 1 and 2, and is a function of the amount and direction that the generation of Plant 2 should be changed with respect to that of Plant 1 in order to provide economic balance between Plants 1 and 2 and equal incremental delivered energy costs for the plants. It is this deviation signal produced between the output conductors 146 and 147 which is combined with the similar deviation signals for the other two pairs of system plants in arriving at the final deviation signals for Plants 2, 3, and 4 with respect to Plant 1.

When Plants 1 and 2 are in economic balance, and hence have equal incremental costs of delivered energy, the aforementioned balance equation is satisfied, the incremental transmission losses and generating costs are in balance, and the incremental generating cost ratio is equal to the incremental transmission loss ratio for the plants. Under this condition, the ratio of the resistances on either side of the slidewire contact 144, which ratio is established by the motor 108 in accordance with the existing incremental transmisison loss ratio, is equal to the ratio of the incremental generating cost voltages for Plants 1 and 2, and the deviation signal between output conductors 146 and 147 is substantially zero. This value of zero for the deviation signal indicates that economic balance exists between Plants 1 and 2, and that the incremental delivered energy cost for Plant 2 is equal to that for Plant 1. As noted above, a value of other than zero for this deviation signal indicates the need for adjustment in the generation of Plant 2 relative to Plant 1 in order to obtain economic balance between these two plants.

Before proceeding with a description of the manner in which the economic balance deviation signal for Plants 1 and 2 is utilized in the subject apparatus, there will be described the details of the typical forms which the wattmeter 101 and the varmeter 102 may take. It is noted in this connection that the forms of the wattmeter and varmeter to be described herein are so described merely by way of illustration and example, and that these devices may be of any form suitable for the purpose and capable of providing the output signals specified hereinbefore.

Figure 2:
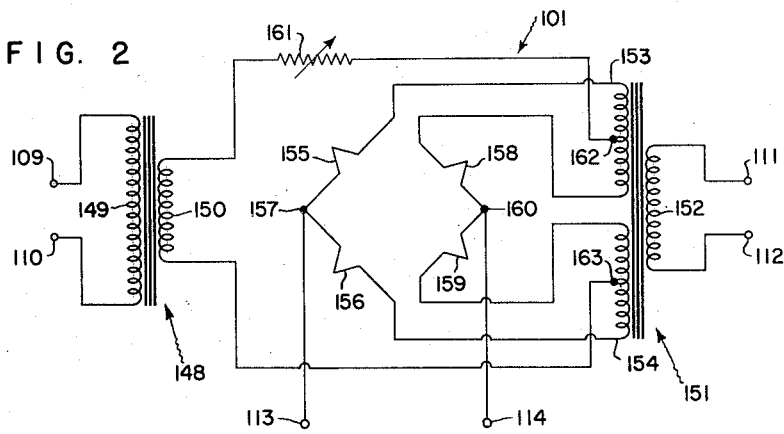
Fig. 2 is a schematic circuit diagram of a typical form for the wattmeters of the Fig. 1 apparatus.

*Fig. 2 wattmeter details*

There are shown in Fig. 2 the details of a typical form which the wattmeter 101 of Fig. 1 may advantageously take. It will be remembered that the purpose of this wattmeter is to provide, between its output terminals 113 and 114, a D. C. output signal of a magnitude proportional to $2K_{1-2} \cos \theta_{1-2}$, where $K_{1-2}$ is the aforementioned constant reactance-resistance ratio for Plants 1 and 2, and $\theta_{1-2}$ is the phase angle between the two A. C. signals applied respectively to the two inputs of the wattmeter.

Figure 4:
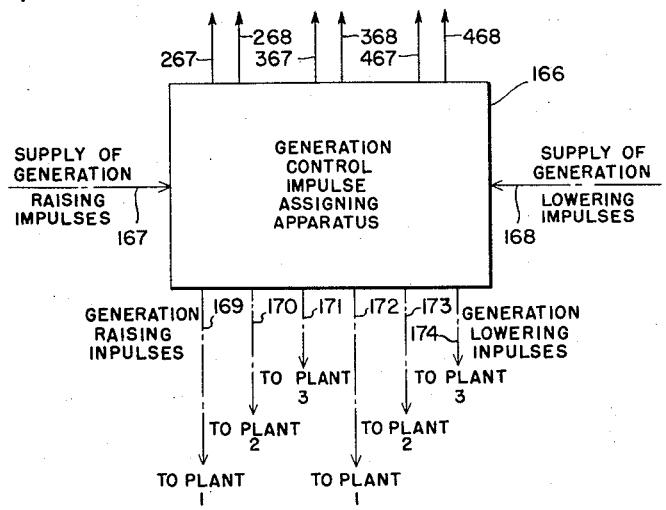
Fig. 4 is a block type circuit diagram of control impulse assigning apparatus useful with the Fig. 1 apparatus.

To this end, the wattmeter 101 of Fig. 2 consists basically of a conventional thermal converter or wattmeter, of the general type disclosed in Fig. 4 of the Miller Patent No. 2,283,566, for example, which has been modified to meet the specific needs of the wattmeter 101 as just described. Briefly, this modification consists in the replacement of the current transformer of the conventional apparatus by a second potential transformer, thereby to enable the device 101 to provide an output which is the desired function of the phase angle between the two input voltages applied thereto, instead of being a function of the phase angle between a voltage and a current as is the usual output of a conventional thermal converter or wattmeter, such as that disclosed by Miller, for example.

In accordance with the foregoing, the wattmeter 101 includes a first potential transformer 148 having a primary winding 149 and a secondary winding 150, and also includes a second potential transformer 151 having a primary winding 152, a first secondary winding 153, and a second secondary winding 154. The primary winding 149 of the transformer 148 is connected between the wattmeter input terminals 109 and 110, while the primary winding 152 of the transformer 151 is connected between the remaining wattmeter input terminals 111 and 112. Accordingly, the two voltage inputs to the wattmeter are applied to the primary windings of the respective transformers 148 and 151.

A first pair of thermocouples 155 and 156 is connected in series between the outer end terminal of the transformer secondary winding 153 and the outer end terminal of the transformer secondary winding 154. The junction 157 between the series-connected thermocouples 155 and 156 is connected to the wattmeter output terminal 113. Similarly, a second pair of thermocouples 158 and 159 is connected in series between the remaining end terminals of the windings 153 and 154, the junction 160 between these thermocouples 158 and 159 being connected to the wattmeter output terminal 114. The transformer secondary winding 150 is connected in series with an adjustable resistor 161 between a center-tap 162 on the winding 153 and a center-tap 163 on the winding 154.

In the manner explained in the above-mentioned Miller patent, a wattmeter arrangement of the type disclosed in Fig. 4 thereof is operative to produce a D. C. output signal which is proportional to $EI \cos \theta$, where E is the voltage applied to the primary winding of the Miller potential transformer 21, I is the current flowing through the primary winding of the Miller current transformer 19, and $\theta$ is the phase angle between this voltage and current. In this same basic manner, the modified form of this arrangement as shown in Fig. 2 of the present application is operative to provide between its output terminals 113 and 114 a D. C. output signal which is proportional to $E_1 E_2 \cos \theta$, where $E_1$ and $E_2$ are the magnitudes of the two A. C. signals respectively applied to the two inputs of the wattmeter 101, and where $\theta$ is the phase angle between these two signals, being specifically the angle by which the input signal applied between the input terminals 109 and 110 leads the signal applied between the input terminals 111 and 112.

In view of the explanation provided in the Miller patent as to the operation of the wattmeter disclosed therein, it is deemed to be unnecessary to elaborate further herein as to the manner in which the wattmeter 101 is operative to provide the output signal just set forth.

It is apparent that the foregoing wattmeter output signal $E_1E_2 \cos \theta$ meets the above-noted requirement of being a signal proportional to $2K_{1-2} \cos \theta_{1-2}$, since the constant value of the factor $2K_{1-2}$ can be readily introduced by the suitable calibration of the wattmeter output, as by adjustment of the resistor 161, and since the values of $E_1$ and $E_2$ can, for convenience, be considered to be unity. When this is done, it is seen that the wattmeter output signal becomes $(1)(1)(2K_{1-2})(\cos \theta_{1-2})$, or simply $2K_{1-2} \cos \theta_{1-2}$.

As was previously noted, however, the two equal wattmeter input signals $E_1$ and $E_2$, which are the respective output signals of the receivers 117 and 217, need not have unit values in actual practice, but instead may have any convenient or suitable value, just as long as this value is the same for both signals. It should be readily apparent that the value of the incremental transmission loss ratio established by the position of the contacts 107 and 144 in the manner described above is independent of the absolute value of $E_1$ and $E_2$.

In summary, it has been shown above that the wattmeter 101 of Fig. 2 is operative, when suitably calibrated in accordance with the existing value of the constant coefficient $2K_{1-2}$, to produce the desired output signal proportional to $2K_{1-2} \cos \theta_{1-2}$. It has also been noted that the resulting incremental transmission loss ratio values computed by the apparatus and established by the positions of the contacts 107 and 144 are independent of the absolute value of the two equal wattmeter input signals.

Figure 3:
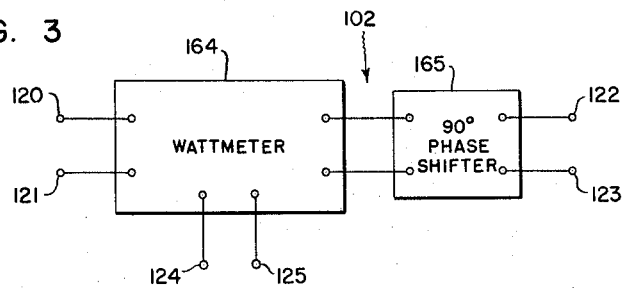
Fig. 3 is a block type circuit diagram of a typical form for the varmeters of the Fig. 1 apparatus.

*Fig. 3 varmeter details*

A typical form which the varmeter 102 of Fig. 1 may advantageously take is shown in Fig. 3. Since the purpose of the varmeter 102 is to provide a D. C. output signal of a magnitude proportional to $\sin \theta_{1-2}$, where $\theta_{1-2}$ is the phase angle or difference between the two varmeter input signals, the varmeter can conveniently consist of a thermal wattmeter, of the type of the wattmeter 101, in combination with a suitable 90° phase shifting device or phase shifter connected in series with one of the varmeter inputs. As is well known, such use of such a phase shifter in combination with a thermal wattmeter produces a varmeter wherein the usual wattmeter output of $EI \cos \theta$ is converted by the presence of the phase shifter into a true varmeter output proportional to $EI \sin \theta$.

To this end, the varmeter 102 of Fig. 3 includes a wattmeter 164 and a phase shifter 165. The wattmeter 164 may be identical to the wattmeter 101 of Fig. 2, and is shown as having one of its two pairs of input terminals connected directly to the varmeter input terminals 120 and 121. The other pair of wattmeter input terminals is connected through the phase shifter 165 to the remaining varmeter input terminals 122 and 123. The wattmeter output terminals are connected respectively to the varmeter output terminals 124 and 125.

In the arrangement just described, the phase shifter 165 causes one of the two input signals applied to the wattmeter 164 to be shifted through 90 electrical degrees with respect to the other of the two wattmeter input signals. Accordingly, the wattmeter output signal, and hence the varmeter output signal, is proportional to $\sin \theta_{1-2}$, as is desired.

It is noted that the actual varmeter output signal produced between the varmeter output terminals 124 and 125 is proportional to $E_1E_2 \sin \theta_{1-2}$, since the two varmeter input signals are the same two signals which are applied to the inputs of the wattmeter 101 as previously described. As was discussed in connection with the wattmeter 101, however, the value of the incremental transmission loss ratio determined by the apparatus is independent of the absolute values of the two input signals applied to both the wattmeter 101 and the varmeter 102.

Accordingly, the varmeter 102 shown in Fig. 3 is capable of providing the desired varmeter D. C. output signal having a magnitude proportional to $\sin \theta_{1-2}$.

ADDITIONAL DESCRIPTION OF SECTION 100

As was specified hereinbefore, the adjustable plant output or load slidewire resistors 138 and 238 of the incremental generating cost computing portion of the Fig. 1 apparatus have their contacts adjusted in accordance with the actual outputs of the corresponding Plants 1 and 2 so as to introduce into the apparatus the actual generating cost for each given value of load on each plant. Accordingly, it is desirable to characterize each of the resistors 138 and 238 in accordance with the input-output characteristic of the corresponding plant.

Since the cost for generating a given output at a given plant, and hence the plant input-output characteristic, usually depends in practice upon the number of generators in the plant which are operating to supply this output, it may be desirable to provide each of the slidewire resistors 138 and 238 with a range switch, not shown, which will permit the characterization of the resistor to be adjusted in accordance with the number of generators which are contributing to the output of the corresponding plant at that time. Alternatively, the single load resistor shown for each plant may be replaced by a plurality of slidewire resistors, not shown, each of which corresponds to a respective one of the generators located at the corresponding plant and is characterized in accordance with the input-output characteristic of its corresponding generator. If this is done, suitable range switches, not shown, can be used to cut each of these resistors in and out of the computer circuit as the corresponding generators are put in and out of load service at the corresponding plant.

As was explained hereinbefore, the resistors 142 and 242 are included in the incremental generating cost ratio computing portion of the apparatus of Fig. 1 for the purpose of causing the incremental generating cost voltages developed therein to include the effect of the fixed components of the incremental generating costs at the plants. Since this fixed component cost factor for a given plant may vary with the number of generators in operation at the plant, it may be desirable to make the resistors 142 and 242 adjustable. This will permit the fixed component cost effect in the computer to be changed, as required, in accordance with changes in the number of generators actively supplying load at the corresponding plant.

DESCRIPTION OF SECTIONS 200 AND 300

There has been previously described herein the manner in which the computing section 100 is constructed and arranged to be operative to provide between its output conductors 146 and 147 a deviation signal having a magnitude and polarity respectively representative of the extent and direction of departure from the most economic loading for Plant 2 relative to Plant 1, and of the amount and direction which the output of Plant 2 should be changed relative to Plant 1 in order to obtain economic balance between these two plants. In the same manner as that described for section 100, section 200 is operative to produce between its output terminals 246 and 247 a deviation signal having a magnitude and polarity which are respectively representative of the amount of direction by which the output or generation of Plant 3 should be changed relative to Plant 2 in order to obtain economic balance between Plants 2 and 3. Similarly, section 300 is operative, upon a departure from economic balance between Plants 3 and 4, to produce between its output conductors 346 and 347 a deviation signal having a magnitude and polarity which are respectively representative of the amount and direction which the generation of Plant 4 should be changed relative to that of Plant 3 in order to obtain economic balance between Plants 3 and 4. These respective deviation signals are produced by the sections 200 and 300 in the same manner as that in which the section 100 produces its deviation signal, this identical operation being achieved by the inclusion in the sections 200 and 300 of components and circuitry which are duplicates of the components and circuitry included in the section 100.

Specifically, the section 200 includes a wattmeter 201 and a varmeter 202 which are supplied with the bus voltage phase angle signal for Plant 2 by the receiver 217, and with a bus voltage phase angle signal for Plant 3 from a receiver 317. This bus voltage phase angle signal for Plant 3 is also applied to the inputs of a wattmeter 301 and a varmeter 302 included in section 300, these instruments also receiving a bus voltage phase angle signal for Plant 4 from a receiver 417.

Further, the fuel price knob 236 for Plant 2 is arranged to adjust a fuel cost slidewire resistor contact 233' in the section 200 at the same time that it adjusts the fuel cost slidewire resistor contact 233 in the section 100. Similarly, a fuel price knob 336 for Plant 3 is arranged to adjust simultaneously fuel price slidewire resistor contacts 333 and 333' which are respectively located in the sections 200 and 300, while a fuel price knob 436 for Plant 4 is arranged to adjust a fuel price slidewire resistor contact 433 in the section 300.

Also, the receiver 241 for the actual output of Plant 2 adjusts an output slidewire resistor contact 239' in section 200 at the same time that it adjusts the output slidewire resistor contact 239 in the section 100. Similarly, a receiver 341 for the actual output of Plant 3 simultaneously adjusts output slidewire resistor contacts 339 and 339' included in the sections 200 and 300, respectively, while a receiver 441 for the actual output of Plant 4 adjusts an output slidewire resistor contact 439 in the section 300.

It should be noted that the primed reference characters appearing herein denote elements which correspond to the respective elements bearing the same but unprimed reference characters, this system of notation being used where two sets of corresponding components are individual to a given plant but are included in two adjacent sections. For example, the corresponding fuel price resistor contacts 233 and 233' are both individual to Plant 2, but are located in the circuitry of sections 100 and 200, respectively.

By virtue of the presence and operation in the sections 200 and 300 of the foregoing and other elements, all of which correspond to those of the section 100, the motor 208 in the section 200 maintains the positions of the slidewire contacts 207 and 244 in accordance with the incremental transmission loss ratio for Plants 2 and 3, while the motor 308 in the section 300 positions the slidewire contacts 307 and 344 in accordance with the incremental transmission loss ratio for Plants 3 and 4. Accordingly, sections 200 and 300 are operative, in the manner described for section 100, to provide the aforementioned deviation signals representative of the extent and direction of departure from economic balance between Plants 2 and 3, and Plants 3 and 4, respectively.

DESCRIPTION OF FINAL DEVIATION INDICATING MEANS

It will be remembered that the stated purpose of the Fig. 1 apparatus is to provide final deviation signals and indications which represent any deviations from economic balance between the reference Plant 1 and the other system of Plants 2, 3, and 4, and hence any departure from system balance. Also, the purpose of this apparatus is to make such signals and indications indicative of the amount and direction by which the generation of any out-of-balance plant should be changed in order to arrive at economic balance between that plant and reference Plant 1. To this end, the output conductors 146, 147, 246, etc. of the sections 100, 200, and 300 are interconnected in such a manner as to cause the individual deviation-from-balance signals produced by these sections to be combined to produce the aforementioned final deviation signals for the entire system.

Three such final deviation signals are produced by the Fig. 1 apparatus, the first of which is representative of any unbalance of Plant 2 with respect to Plant 1, the second of which is representative of any unbalance of Plant 3 with respect to Plant 1, and the third of which is representative of any unbalance of Plant 4 with respect to Plant 1. When the magnitudes of all of these final deviation signals are maintained at or substantially at zero, the plants of all possible pairs of system plants are maintained in substantially complete economic balance with each other, whereby the entire system is maintained in substantially complete economic balance.

To the end of producing these three final deviation signals by interconnecting the outputs of the sections 100, 200, 300 and relating the output signals of these sections, the output conductor 146 of section 100 is connected to the output conductor 247 of section 200, while the output conductor 246 of section 200 is connected to the output conductor 347 of section 300. The final deviation signal for Plants 1 and 2 appears, as previously noted, between conductor 147 and connected conductors 146 and 247, and is applied across an indicating device 266 for indicating the magnitude and direction of any deviation from economic balance between Plants 1 and 2. To this end, the indicator 266 is connected between the conductor 147 and connected conductors 146 and 247. Output conductors 267 and 268 are connected across the indicator 266 to permit the deviation signal for Plants 1 and 2 to be applied, if desired, to other apparatus, such as the automatic plant load controlling apparatus of Fig. 4 to be described hereinafter.

Similarly, the final derivation signal for Plants 1 and 3 appears between conductor 147 and connected conductors 246 and 347, and is applied across an indicating device 366 for indicating the magnitude and direction of any deviation from economic balance between Plants 1 and 3. To this end, the indicator 366 is connected between the conductor 147 and the connected conductors 246 and 347. Output conductors 367 and 368 are connected across the indicator 366 for permitting the deviation signal for Plants 1 and 3 to be applied to other apparatus, if desired.

In like manner, the final deviation signal for Plants 1 and 4 appears between conductor 147 and conductor 346, and is applied across a deviation indicator 466 for indicating the magnitude and direction of any deviation from economic balance between Plants 1 and 4. To this end, indicator 466 is connected between conductors 147 and 346. Output conductors 467 and 468 are connected across the indicator 466 for permitting the deviation signal for Plants 1 and 4 to be applied to other apparatus, if desired.

In summary, it is noted that the above-described interconnection of the output conductors of the sections 100, 200, and 300, and the resulting combination of the section output signals representative of deviation between Plants 1 and 2, Plants 2 and 3, and Plants 3 and 4, result in the production across the indicators 266, 366, and 466 of respective deviation signals for Plants 2, 3, and 4 with respect to Plant 1. The manner in which this action occurs can be readily appreciated when it is noted that the connections shown and described result in the connection of the output signals of the sections 100, 200, and 300 in series with respect to Plant 1. It can also be readily appreciated that, when Plants 2, 3, and 4 are in economic balance with respect to Plant 1, all possible pairs of Plants 1, 2, 3, and 4 are also in economic balance, as is the entire system which is composed of these plants.

The indicators 266, 366, and 466 constitute the deviation indicating means mentioned earlier herein, and may well be zero-center voltmeters. It should be clear in the light of the foregoing description that these meters are operative to indicate which, if any, of the system plants should have their generation raised or lowered with respect to reference Plant 1 in order to provide the most economical combination of plant loadings and the most economical operation of the system, and that the deviation signal values indicated by these meters represent the approximate magnitude and direction of each needed generation change.

TYPICAL USE AND OPERATION OF THE FIG. 1 APPARATUS

As will be clear from the foregoing description, the Fig. 1 apparatus is an arrangement for assigning the loads to the generating plants of a power system in acordance with the incremental costs of delivered energy for the plants so as to secure the most economical loading of the plants, and the most economical operation of the system. To this end, the apparatus includes the above-described economic balance deviation computing or detecting and indicating portions which provide the foregoing indications of the final balance deviation signals or voltages. As noted above, these indicated deviations represent several quantities, notably the extent and direction of deviation from balance and from the most economical loading for Plants 2, 3, and 4 with respect to reference Plant 1, and the differences between the incremental costs of delivered energy for Plants 2, 3, and 4 and Plant 1. Also, the magnitudes and directions of these indicated final deviation voltages represent the approximate amounts and directions that the generation of Plants 2, 3, and 4 should be changed with respect to Plant 1 in order to obtain the desired optimum plant loading combination and economic system operation.

Therefore, in the use of the Fig. 1 apparatus for assigning the loads to Plants 2, 3, and 4 on an economic basis, the deviation indications provided by the indicators 266, 366, and 466 of the apparatus are advantageously utilized as the basis on which to instruct the operators of Plants 2, 3, and 4 as to how they should load their plants at any given time in order to maintain economic system operation under the existing conditions.

Specifically, in such typical use and operation of the Fig. 1 apparatus, the indication provided by each of the deviation indicators 266, 366, and 466 is observed as necessary, and the corresponding plant is instructed, as by telephone or telemetering, to raise or lower its generation or output as dictated by the magnitude and direction of any deviation appearing on the corresponding indicator, the extent of the total load change requested being that required to reduce the corresponding deviation substantially to zero.

For example, when all of the indicators indicate substantially zero deviations, all plants are loaded economically and are in economic balance, and the system operates in the most economical manner. An indication of other than zero on any indicator, however, shows a departure from economic balance and a need for adjustment of the output of the corresponding plant, relative to Plant 1, in order to reinstate balance. Thus, upon a system load or other change which temporarily destroys the economic balance and load division of the system, deviation indications appear on the indicators and indicate which plants need to have their generation raised or lowered, with respect to Plant 1, in order to restore economic operation. These indications also represent the direction and approximate magnitude of the needed generation changes.

Upon the appearance of such deviation indications, the necessary plants are instructed, on the basis of the magnitudes and directions of the indications, to change their generation or outputs in the required directions. These adjustments in the generation between the plants are continued, preferably starting first with the plant exhibiting the greatest deviation, until all of the deviations and their indications have been reduced substantially to zero, at which time economic balance and economic system operation will have been restored.

Therefore, the Fig. 1 apparatus is operative to assign the loads to the system plants in accordance with their incremental costs of delivered energy, and according to the optimum or most economic generating or loading schedule for the existing system load conditions. Thus, the plant loads are assigned by the apparatus in such a manner as to provide the most economical operation of the system under the various operating conditions thereof.

To provide the greatest possible accuracy of operation, it is desirable to choose as the plants of each pair, such as Plants 1 and 2, and Plants 2 and 3, plants of the system which are adjacent electrically. Such selection serves to minimize the influences of intervening plants on the incremental transmission loss ratios computed for plants at the extreme portions of the system.

Moreover, it is usually desirable to locate the Fig. 1 load assigning apparatus at a point at which the apparatus can conveniently be supplied with the bus voltage and output data for each plant, as by means of telemetering as illustrated, and from which each plant can conveniently be sent instructions as to the magnitude of the load it is to carry in order to provide economical system operation.

THE AUTOMATIC LOAD CONTROL ARRANGEMENT OF FIG. 4

As was mentioned hereinbefore, the final balance deviation voltages produced by the apparatus can, if desired, be utilized to control the generation and outputs of the plants automatically as necessary to maintain the most economic operation of the system. Thus, as was noted previously herein, the deviation voltages or signals applied to the indicators 266, 366, and 466 are also applied, respectively, to the output conductors 267—268, 367—368, and 467—468, which conductors can be employed to apply the final deviation signals to a suitable device for automatically controlling the plant outputs in accordance with said signals.

The manner in which such a plant load control device can be combined with the Fig. 1 apparatus to provide automatic economic control of the plant loadings is illustrated in Fig. 4. Thus, there is shown therein a plant load or output control device 166 which is arranged to receive the deviation output signals from the Fig. 1 apparatus and to apply suitable generation or load control signals to the plants for controlling the plant generation in accordance with the deviation signals and in such a manner as to maintain these signals as close as possible to zero, and hence maintain the most economical loading and operation of the system.

As an example of a suitable form of plant generation controlling apparatus for use with the Fig. 1 apparatus, the device 166 of Fig. 4 has been shown as being of the type which controls the generation and load outputs of the plants by supplying to the plants controlled quantities of generation raising and lowering impulses. Each plant which is to receive and be controlled by such impulses is arranged, in the well known manner, to increase its generation and output as long as it receives raising impulses from the control apparatus, and to decrease its generation and output as long as it receives lowering impulses from the control apparatus.

To this end, the generation control impulse assigning apparatus or controller 166 of Fig. 4 is shown as being supplied with the final deviation signals from the Fig. 1 apparatus by means of the output conductors 267, 268, 367, 368, 467, and 468, which conductors are shown connecting the Fig. 1 apparatus output to the controller input. The controller 166 is also shown as receiving a supply of generation raising impulses, by way of a connection 167, and a supply of generation lowering impulses, by way of a connection 168, from a suitable source, not shown. In the well known manner for apparatus controlling plant generation by means of such impulses, the impulses supplied to the controller from said source may well be so supplied only under system conditions which require a change in generation in the system, the supplied impulses advantageously being of the usual type occurring at regular intervals but having a duration which is related to the magnitude of said required change.

The controller 166 is also shown as having a plurality of output connections 169 through 174, from which the generation raising and lowering impulses are sent, as by telemetering, to the several Plants 2, 3, and 4 under the control of the deviation signals applied to the controller. Thus, each of Plants 2, 3, and 4 can be supplied with both raising and lowering impulses, as dictated by the load assigning apparatus of Fig. 1 through the medium of the deviation signals applied to the controller 166.

As an example of the typical operation of the arrangement as just described, let it be assumed that the controlled system is operating in the most economical manner, with no need for change or reallocation of the plant generation. Under this condition, there are no impulses supplied to the controller 166, no deviation signals to be supplied thereto, and therefore no impulses sent out to the plants.

Upon the occurrence of conditions which temporarily destroy the economic balance of the system, and which require a change to be effected in the system generation, suitable impulses are supplied to the controller 166 over the connections 167 and 168, as are the appropriate deviation signals over the corresponding ones of the conductors 267, 268, etc. The controller is then operative to assign the appropriate impulses to the plants whose generation and outputs are to be changed as determined and dictated by the deviation signals. Such impulses are so assigned and supplied to the plants until the desired system operation is obtained, and economic loading and balance are restored.

THE MODIFICATION OF FIG. 5

Figure 5:
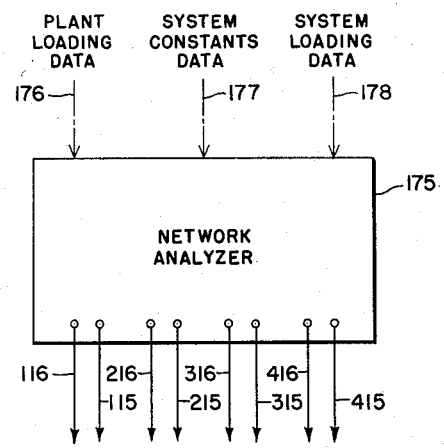
Fig. 5 is a block type circuit diagram of a portion of a modified form of the Fig. 1 apparatus.

As previously noted, the plant bus voltage phase angle data supplied to the apparatus may, if desired, be supplied by a simplified network analyzer instead of being obtained directly from the plants as shown in Fig. 1. To this end, there is shown in Fig. 5 a portion of a modification of the Fig. 1 arrangement wherein the phase angle data telemetering connections and the telemetering receivers 117, 217, 317, and 417 are replaced by a typical network analyzer 175 which is set up in the well known manner to simulate the actual system including the Plants 1–4. Accordingly, there can be and are obtained from appropriate points in the simulated system of the analyzer signals having phases representative of the actual phases of the plant bus voltages in the actual system.

Specifically, the analyzer 175 is shown in Fig. 5 as being supplied with the usual data necessary to cause the simulated system of the analyzer to simulate the actual system dynamically as well as statically. Thus, data as to the existing values of the actual plant loads or outputs is supplied to the simulated system of the analyzer by a connection 176, this data being obtained, for example, from the actual plant output data telemetered to the Fig. 1 apparatus. Also data as to the constants of the actual system, such as transmission line impedances and load locations, is supplied to the analyzer 175 by a connection 177. Finally, data as to the actual, existing system loads is supplied to the analyzer 175 by a connection 178.

It is to be understood that the foregoing arrangement for supplying data to the simulated system of the analyzer, and the particular data supplied thereby, are disclosed herein merely by way of example for the purpose of illustrating the typical use of a typical analyzer as a source of the phase angle data needed by the Fig. 1 apparatus. Accordingly, it is noted that the analyzer could be supplied with whatever data and in whatever manner necessary or convenient for the particular conditions involved in any given case.

To the end of supplying the wattmeters and varmeters of the Fig. 1 apparatus with the phase angle signals obtained from the simulated system of the analyzer and representing the actual plant bus voltage phase angles, the analyzer is provided with output terminals to which are connected the conductors 115, 116, 215, 216, etc. Thus, for example, there is supplied to the wattmeter 101 the varmeter 102, over the respective pairs of conductors 115—116 and 215—216, two signals obtained from the simulated system of the analyzer, the phase angle between these signals being representative of the phase angle actually existing between the bus voltages of Plants 1 and 2. Similarly, each of the others of the wattmeters and varmeters is supplied with two signals from the analyzer, the phase angle between these signals being representative of the actual phase angle between the bus voltages of the corresponding plants.

A form of network analyzer arranged to supply signals representative of the actual bus voltage phase angles of the plants of an actual, operating system is shown in detail in a copending application of mine, Serial No. 632,756, filed on even date herewith.

CONCLUSION

By virtue of the use of the foregoing phase angle method and resulting equation as the basis for the computation of the incremental transmission loss ratio effected by the Fig. 1 apparatus, the latter possesses many features of practical significance, as should be readily apparent in the light of the foregoing description. For example, such use permits the incremental transmission loss ratios to be computed, and to be compared in arriving at the final deviation signals, by apparatus which is not unduly complex. Also, the incremental transmission loss ratios computed by this apparatus are independent of the relative or absolute magnitudes of the plant bus voltages, of the real power and reactive power ratios existing at the plants, of wide variations in load pattern, and of transmission line outages. Thus, the accuracy with which the incremental transmission losses are coordinated by the apparatus with the incremental generating costs in producing the final deviation signals is substantially independent of:

(1) The magnitudes of the system loads;

(2) Extreme variations in system load pattern, due, for example, to strikes in industrial plants, etc.;

(3) Daily and seasonal variation in generated voltage levels and in the amount of normal voltage drop between plants and loads;

(4) Changes in phase angles in the system;

(5) The ratio of the real and reactive powers at various plants, and variations in these ratios; and (6) The switching in and out of transmission lines.

It should be readily apparent from the foregoing that there has been provided novel apparatus for assigning the loads to the generating plants of a power system in accordance with their incremental costs of delivered energy, this apparatus utilizing plant bus voltage phase angles to compute incremental transmission loss ratios which are compared with incremental generating cost ratios, computed on the basis of fuel cost and plant loading information supplied to the apparatus, to provide coordination of the incremental generating costs and the incremental transmission losses for the plants. The results of these comparisons appear as deviation voltages, these voltages being functions of the amount that the generation of each plant should be raised or lowered with respect to a chosen reference plant in order to provide the most economical combination of plant loadings. These deviation voltages are supplied to indicators and/or to automatic control equipment.

What is claimed is:

1. Apparatus for detecting deviation from economic balance between interconnected generating plants, comprising computing means having an input and an output, means adapted to apply to said input signals representative of the actual phase angle $\theta$ between the bus voltages of two of said plants, said computing means being operative to produce from said signals an effect representative of the incremental transmission loss ratio $$\frac{K \cos \theta + \sin \theta}{K \cos \theta - \sin \theta}$$

for said two plants, where K is the ratio of the reactance to the resistance of the equivalent path interconnecting said two plants, and comparison means included in said computing means and operative to compare said effect to an effect representative of the ratio of the incremental generating costs of said two plants, and to produce in said output a signal representative of any deviation between said effects, and hence representative of any deviation from economic balance between said two plants.

2. Apparatus for detecting deviation from economic balance between interconnected generating plants, comprising first and second computing means, each having an input and an output, means adapted to apply to said input of said first means signals representative of the actual phase angle between the bus voltages of a first and a second of said plants, said first computing means being operative to produce from said signals an effect representative of the incremental transmission loss ratio for said first and second plants, first comparison means included in said first computing means and operative to compare said effect to an effect representative of the incremental generating cost ratio for said first and second plants, and to produce in said output of said first computing means a first output signal representative of any deviation between said effects, and hence representative of any deviation from economic balance between said first and second plants, means adapted to apply to said input of said second computing means signals representative of the actual phase angle between the bus voltages of said second and a third of said plants, said second computing means being operative to produce from the last mentioned signals a second effect representative of the incremental transmission loss ratio for said second and third plants, second comparison means included in said second computing means and operative to compare said second effect to a third effect representative of the incremental generating cost ratio for said second and third plants, and to produce in said output of said second computing means a second output signal representative of any deviation between said second and third effects, and hence representative of any deviation from economic balance between said second and third plants, a first responsive device connected across the output of said first computing means and responsive to said first output signal and to unbalance between said first and second plants, a second responsive device, and means connecting the outputs of said first and second computing means in series across said second responsive device, whereby the latter is responsive to unbalance between said first and third plants.

3. Apparatus for detecting deviation from economic balance between interconnected generating plants, comprising computing means having an input and an output, means adapted to apply to said input signals representative of the actual phase angle between the bus voltages of two of said plants, said computing means being operative to produce from said signals an effect representative of the incremental transmission loss ratio for said two plants, comparison means included in said computing means and operative to compare said effect to an effect representative of the incremental generating cost ratio for said two plants, and to produce in said output an output signal representative of any deviation between said effects and between said loss and cost ratios, and hence representative of any deviation from economic balance between said two plants, and means responsive to said output signal and operative to adjust the output of one of said two plants as necessary to reduce said output signal substantially to zero.

4. Apparatus for assigning the loads to the interconnected generating plants of a power system in accordance with the incremental costs of delivered energy for the plants, comprising incremental transmission loss ratio computing means having an input and an output, means adapted to apply to said input signals representative of the actual phase angle between the bus voltages of two of said plants, said computing means being operative to produce in said output on the basis of said phase angle a first effect representative of the incremental transmission loss ratio for said two plants, incremental generating cost ratio computing means having an input and an output, means adapted to apply to the last mentioned input effects representative of the generating cost and output of each of said two plants, the last mentioned computing means being operative to produce in the last mentioned output a second effect which is representative of the incremental generating cost ratio for said two plants, means operative to coordinate the incremental transmission losses and the incremental generating costs for said two plants, including comparison means operative to compare said first and second effects and to produce an output signal representative of the extent and direction of any deviation between said ratios, and hence representative of the incremental cost of delivered energy for one of said two plants relative to the other.

5. Apparatus as specified in claim 4, wherein there are included means responsive to said output signal for assigning the load to one of said two plants in accordance with said output signal.

6. Apparatus as specified in claim 5, wherein said responsive means includes control means operative to adjust the output of said one of said two plants as necessary to reduce said output signal substantially to zero.

7. Apparatus for assigning the loads to the interconnected generating plants of a power system in accordance with the incremental costs of delivered energy for the plants, comprising incremental transmission loss ratio computing means including a first device having an input and an output, means adapted to apply to said input two A. C. signals displaced in phase by an angle representative of the phase angle between the bus voltages of first and second of said plants, said first device being operative to produce in said output a first output signal which is a predetermined function of the cosine of said phase angle, a second device having an input and an output, means adapted to apply to the last mentioned input two A. C. signals displaced in phase by an angle representative of said phase angle, said second device being operative to produce in the last mentioned output a second output signal which is a predetermined function of the sine of said phase angle, circuit means operative to combine said first and second output signals to produce a first effect which is representative of the ratio of the incremental transmission losses for said first and second plants, said apparatus also comprising incremental generating cost ratio computing means having an input and an output, means adapted to apply to the last mentioned input effects representative of the generating cost and output of each of said first and second plants, the last mentioned computing means being operative to produce in the last mentioned output a second effect which is representative of the incremental generating cost ratio for said first and second plants, means operative to coordinate the incremental transmission losses and the incremental generating costs for said first and second plants, including comparison means operative to compare said first and second effects and to produce an output signal representative of the extent and direction of any deviation between said ratios, and hence representative of the incremental cost of delivered energy for one of said first and second plants relative to the other, and means responsive to said output signal for assigning the load to one of said first and second plants in accordance with said output signal.

8. Apparatus for assigning the loads to the interconnected generating plants of a power system in accordance with the incremental costs of delivered energy for the plants, comprising first incremental transmission loss ratio computing means having an input and an output, means adapted to apply to said input signals representative of the actual phase angle between the bus voltages of first and second of said plants, said computing means being operative to produce in said output on the basis of said phase angle a first effect which is representative of the incremental transmission loss ratio for said first and second plants, first incremental generating cost ratio computing means having an input and an output, means adapted to apply to the last mentioned input effects representative of the generating cost and output of each of said first and second plants, the last mentioned computing means being operative to produce in the last mentioned output a second effect which is representative of the incremental generating cost ratio for said first and second plants, means operative to coordinate the incremental transmission losses and the incremental generating costs for said first and second plants, including comparison means operative to compare said first and second effects and to produce a first output signal representative of the extent and direction of any deviation between said ratios, and hence representative of the incremental cost of delivered energy for said second plant relative to said first plant, second incremental transmission loss ratio computing means having an input and an output, means adapted to apply to the last mentioned input signals representative of the actual phase angle between the bus voltages of said second and a third of said plants, the last mentioned computing means being operative to produce in the last mentioned output on the basis of the last mentioned phase angle a third effect which is representative of the incremental transmission loss ratio for said second and third plants, second incremental generating cost ratio computing means having an input and an output, means adapted to apply to the last mentioned input effects representative of the generating cost and output of each of said second and third plants, the last mentioned computing means being operative to produce in the last mentioned output a fourth effect representative of the incremental generating cost ratio for said second and third plants, means operative to coordinate the incremental transmission losses and the incremental generating costs for said second and third plants, including comparison means operative to compare said third and fourth effects and to produce a second output signal representative of the extent and direction of any deviation between said ratios for said second and third plants, and hence representative of the incremental cost of delivered energy for said third plant relative to said second plant, means responsive to said first output signal for assigning the load to said second plant in accordance with said first output signal, and means responsive to the algebraic sum of said first and second output signals for assigning the load to said third plant in accordance with said sum.

9. Apparatus for detecting deviation from economic balance between interconnected generating plants of a power system, comprising a first device having an input and an output, means adapted to apply to said input two A. C. signals displaced in phase by an angle representative of the phase angle between the bus voltages of first and second of said plants, said first device being operative to produce in said output a first output signal which is a predetermined function of the cosine of said phase angle, a second device having an input and an output, means adapted to apply to the last mentioned input two A. C. signals displaced in phase by an angle representative of said phase angle, said second device being operative to produce in the last mentioned output a second output signal which is a predetermined function of the sine of said phase angle, first circuit means operative to combine said first and second output signals to produce a first effect which is representative of the ratio of the incremental transmission losses for said first and second plants, other circuit means operative to produce a second effect which is representative of the incremental generating cost ratio for said first and second plants, and means operative to compare said first and second effects and to produce a first deviation output signal representative of any difference between said first and second effects, and hence representative of any deviation between said loss and cost ratios, and any deviation from economic balance between said first and second plants.

10. Apparatus as specified in claim 9, wherein there is included a third device having an input and an output, means adapted to apply to the last mentioned input two A. C. signals displaced in phase by an angle representative of the phase angle between the bus voltages of said second and a third of said plants, said third device being operative to produce in the last mentioned output a third output signal which is a predetermined function of the cosine of the last mentioned phase angle, a fourth device having an input and an output, means adapted to apply to the last mentioned input two A. C. signals displaced in phase by an angle representative of said last mentioned phase angle, said fourth device being operative to produce in the last mentioned output a fourth output signal which is a predetermined function of the sine of said last mentioned phase angle, other circuit means operative to combine said third and fourth output signals to produce a third effect which is representative of the ratio of the incremental transmission losses for said second and third plants, other circuit means operative to produce a fourth effect which is representative of the incremental generating cost ratio for said second and third plants, means operative to compare said third and fourth effects and to produce a second deviation output signal representative of any difference between said third and fourth effects, and hence representative of any deviation between the loss and cost ratios for said second and third plants, a first responsive device connected to respond to said first deviation output signal and to unbalance between said first and second plants, and a second responsive device connected to respond to the algebraic sum of said first and second deviation output signals, and hence to unbalance between said first and third plants.

11. Apparatus as specified in claim 10, wherein said first responsive device is operative to adjust the output of said second plant as necessary to reduce said first deviation output signal substantially to zero, and wherein said second responsive device is operative to adjust the output of said third plant as necessary to reduce said sum of said first and second deviation output signals substantially to zero.

12. Apparatus as specified in claim 9, wherein said first circuit means includes a resistor having a contact adjustable therealong and also includes resistance means, wherein said first output signal is applied across said resistor and resistance means in parallel, wherein said second output signal is applied in series with current detecting means between said contact and a point on said resistance means, and wherein said first effect is the position of said contact along said resistor for substantially no current flow through said detecting means.

13. Apparatus as specified in claim 12, wherein said first output signal is proportional to $2K \cos \theta$, where K is the ratio of the reactance to the resistance of the equivalent path interconnecting said two plants, and $\theta$ is said phase angle, wherein said second output signal is proportional to $\sin \theta$, and wherein said ratio is $$\frac{K \cos \theta + \sin \theta}{K \cos \theta - \sin \theta}$$

14. Apparatus as specified in claim 12, wherein said second circuit means includes a second resistor having a second contact which is adjusted along said second resistor simultaneously with the adjustment of the contact along the first mentioned resistor, wherein said other circuit means includes means for connecting said second resistor in series with sources of voltages representing the incremental generating costs for said first and second plants for producing across said second resistor a voltage which is the sum of the last mentioned voltage, and wherein said first deviation output signal is produced between said second contact and a point in said other circuit means between said sources.

15. Apparatus for producing an effect representative of the incremental transmission loss ratio for a pair of interconnected generating plants, comprising a first device having an input and an output, means adapted to apply to said input two A. C. signals displaced in phase by an angle representative of the phase angle between the bus voltages of said two plants, said first device being operative to produce in said output a first output signal which is a predetermined function of the cosine of said phase angle, a second device having an input and an output, means adapted to apply to the last mentioned input two A. C. signals displaced in phase by an angle representative of said phase angle, said second device being operative to produce in the last mentioned output a second output signal which is a predetermined function of the sine of said phase angle, and circuit means operative to combine said first and second output signals to produce an effect which is representative of the ratio of the incremental transmission losses for said two plants.

16. Apparatus as specified in claim 15, wherein said first output signal is proportional to $2K \cos \theta$, where K is the ratio of the reactance to the resistance of the equivalent path interconnecting said two plants, and $\theta$ is said phase angle, wherein said second output signal is proportional to $\sin \theta$, and wherein said ratio is $$\frac{K \cos \theta + \sin \theta}{K \cos \theta - \sin \theta}$$

17. Apparatus as specified in claim 16, wherein said apparatus includes a resistor having a contact adjustable therealong, and includes means operative to adjust said contact along said resistor to the position at which the resistance of said resistor on one side of said contact is proportional to $K \cos \theta + \sin \theta$, and at which the resistance of said resistor on the other side of said contact is proportional to $K \cos \theta - \sin \theta$, and wherein said effect is said position of said contact along said resistor.

18. Apparatus as specified in claim 9, wherein said A. C. signals are derived from means responsive to other signals representative of said phase angle supplied to the last mentioned means from said first and second plants.

19. Apparatus as specified in claim 9, wherein said A. C. signals are derived from a simulated system as provided by a network analyzer arranged to simulate the actual system including said plants.

No references cited.